United States Patent [19]

Lewis et al.

[11] 3,932,372
[45] Jan. 13, 1976

[54] PEROXIDE CO-INITIATOR SYSTEM FOR POLYMERIZATION

[75] Inventors: Roger N. Lewis, Pinole; Ronald L. Friedman, San Rafael, both of Calif.

[73] Assignee: Argus Chemical Corporation, Brooklyn, N.Y.

[22] Filed: Nov. 15, 1973

[21] Appl. No.: 415,877

Related U.S. Application Data

[63] Continuation of Ser. No. 56,714, July 20, 1970, abandoned.

[52] U.S. Cl. ..... 260/92.8 W; 252/610 D; 260/80 M; 260/80 C; 260/80.77; 260/80.78; 260/80.81; 260/86.1 E; 260/86.3; 260/86.7; 260/87.1; 260/87.3; 260/87.5 R; 260/87.5 C; 260/88.1; 260/88.2; 260/89.5 A; 260/89.5 AW; 260/92.8 R

[51] Int. Cl.² ................ C08F 114/02; C08F 114/16

[58] Field of Search ..... 260/92.8 W, 610 D, 92.8 R, 260/92.8, 94.8, 94.9, 93.7, 93.5 R, 91.7, 93.5 W, 89.5 A, 80 M, 80 C, 80.77, 80.78, 80.81, 86.1 E, 86.3, 86.7, 87.1, 87.3, 87.5 R, 87.5 C, 88.1, 88.2

[56] References Cited

UNITED STATES PATENTS

| | | | |
|---|---|---|---|
| 2,698,863 | 1/1955 | Dickey | 260/92.8 W |
| 3,022,281 | 2/1962 | Smith | 260/92.8 W |
| 3,108,093 | 10/1963 | Pajaczkowski et al. | 260/89.5 R |
| 3,420,807 | 1/1969 | Harrison et al. | 260/92.8 |
| 3,580,955 | 5/1971 | Bafford | 260/610 D |
| 3,637,633 | 1/1972 | Dixon et al. | 260/92.8 W |
| R25,763 | 4/1965 | Marous et al. | 260/92.8 W |

*Primary Examiner*—Joseph L. Schofer
*Assistant Examiner*—Herbert J. Lilling

[57] ABSTRACT

A co-initiator system for polymerization of ethylenically unsaturated monomers comprising a preformed nitrile containing azo compound or symmetrical, diacyl peroxide in combination with an in situ or preformed acyl peroxy alkyl carbonate.

5 Claims, No Drawings

PEROXIDE CO-INITIATOR SYSTEM FOR POLYMERIZATION

This is a continuation of application Ser. No. 56,714, filed July 20, 1970 and now abandoned.

This invention pertains to the polymerization of ethylenically unsaturated monomers, and more particularly to the polymerization of ethylenically unsaturated monomers with novel, organic-peroxide containing co-initiator systems.

The novel co-initiator systems of this invention comprise a preformed, nitrile containing azo compound or a preformed symmetrical, diacyl peroxide in combination with an acyl peroxy alkyl carbonate. Suitable preformed nitrile containing azo compounds include those of the formula:

$$[N \equiv C - R_1 - N =]_2$$

wherein $R_1$ is a branched or straight chain hydrocarbon having up to 20 carbon atoms. It is preferred that $R_1$ contain less than 10 carbon atoms. It is contemplated that $R_1$ will include non-interfering substituents. Exemplary of these nitrile containing azo compounds are $\alpha, \alpha'$-azobis-2,4-dimethylvaleronitrile and $\alpha, \alpha'$-azobis-isobutyronitrile, the preparation of which are disclosed in U.S. Pat. No. 2,471,959.

In general, any preformed, symmetrical diacyl peroxide including those heretofore employed in the polymerization of ethylenically unsaturated monomers may be substituted herein for the nitrile containing azo compounds. These peroxide initiators are of the formula:

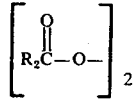

wherein $R_2$ is any substituted or non-substituted organic group which will not interfere with the initiator activity of the peroxide. This definition includes the branched or straight chain alkyls having from about 1 to 18 carbon atoms, less than 13 carbon atoms particularly preferred. Also preferred groups are the aryls, cycloalkyls, and substituted derivatives thereof. Such groups include methyl, ethyl, isopropyl, n-propyl, isobutyl, n-butyl, hexyl, octyl, nonyl, undecyl, tridecyl, cyclohexyl, benzyl, 3-chloropropyl, etc. Examples of preferred diacyl compounds to be utilized in the co-initiator system of this invention include lauroyl peroxide, pelargonoyl peroxide, isononoyl peroxide, myristoyl peroxide, and the like. The preparations of the various diacyl peroxides included herein as co-initiators are well known to those skilled in this art.

The present invention involves the use of the aforementioned preformed nitrile containing azo compound or symmetrical peroxide in the presence of the second co-initiator, an acyl peroxy alkyl carbonate of the formula:

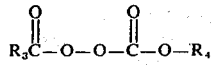

wherein $R_3$ and $R_4$ can be branched or straight chain alkyls, cycloalkyls and substituted derivatives thereof that contain non-interfering constituents, e.g. the halo derivatives. In addition, the $R_3$ group can be aromatic. It is advantageous, though not required, that the straight and branched chain alkyl have less than 18 carbon atoms; less than 13 carbon atoms particularly preferred. The preparation of the various peroxy carbonates used herein as a co-initiator are well known to those skilled in this art.

In a preferred aspect, it has been found particularly advantageous to generate the peroxy carbonate in situ, i.e., where it is consumed simultaneously with its formation. In this manner, the requirement for refrigeration and attendant dangers of explosion can be completely eliminated. While the in situ peroxy carbonate may be prepared by any well-known techniques, it is preferably formed by reacting a peracid with an aliphatic alkyl chloroformate, as illustrated by the following incomplete formula:

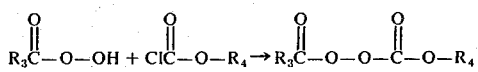

wherein $R_3$ and $R_4$ are as previously defined.

It will be apparent to one skilled in this art that a small amount of base must be added to the reaction system to neutralize hydrochloric acid generated in the course of the reaction. Thus, the reaction is driven further to completion. Generally, any organic or inorganic base strong enough to neutralize the HCl being generated can be used herein. Suitable bases include pyridine, 3-picoline, quinoline, N,N-diethyl analine, 2,6-lutidine, NaOH, $NaHCO_3$, $Na_3PO_4$, and the like.

Polymerization of ethylenically unsaturated monomers can be carried out either in a bulk, emulsion or suspension system. In a bulk system, a single monomer phase is present, polymerization occurring therein. In emulsion and suspension systems, monomer is respectively emulsified and suspended in a liquid (water) phase. In both such systems, the polymer product precipitates in the water phase.

It has been unexpectedly found that when polymerization is accomplished with in situ formation of the peroxy carbonate in an emulsion or suspension, and with the proper selection of the base, consistently higher polymer yields are obtained. Though not wishing to be bound by the following theory, it is believed that the rate of the in situ reaction is dependent in part upon the proximity of the base to the other in situ reactants. In other words, the distribution of base in the monomer and water phases appears to be controlling.

The peracid and chloroformate reactants themselves have varying degrees of solubility in the two phases, the degree of solubility in each phase a function, in part, of the nature of the $R_4$ and $R_3$ groups. Generally, the larger these groups, the more preferentially soluble the reactant will be in the monomer phase. The preferred base, therefore, will have solubility characteristics which most nearly match those of the other in situ reactants. In some cases a water soluble base such as NaOH will give best results. In others, a more organic soluble base such as pyridine will give best results. Proper selection of the base can be afforded by routine experimentation. However, in the bulk polymerization, an organic base should always be employed.

For emulsion polymerization, unlike a viscous, suspension polymerization, the reaction system may be stirred to improve contact between the peracid and chloroformate reactants and the base. Proper selection of the base, therefore, is not quite as critical.

The ratio of peroxy carbonate to nitrile or symmetrical diacyl peroxy initiator may vary from 1:10 parts by weight, to 1:2 parts by weight. The temperature of the polymerization reaction is not critical, and can range generally from 40° C. to 70° C., 50° C. to 60° C. being preferred. At these temperatures, the acyl peroxy alkyl carbonates have a half life of approximately 10 hours. For the above reaction temperatures, reaction times will vary from 6 to 12 hours. The reaction times are a function of the temperature of the reaction and the quantity of monomer conversion desired. All other factors being equal, longer reaction times normally result in greater polymer yields. Other considerations, however, may necessitate the use of higher reaction temperatures to reduce reaction times.

When in situ formation of the peroxy carbonate is employed, production of the co-initiator system approaches 100% of theoretical. Thus, the initiator formed is equal to (and controlled by) the molar amount of chloroformate or peracid charged to the reaction system. However, to insure maximum in situ formation of peroxy carbonate, the amount of peracid and base added to the reaction system should generally be in a 10 and 20 mole percent excess respectively.

The ethylenically unsaturated monomers polymerized using the co-initiator systems of this invention may be any of those which have previously been polymerized with peroxide initiators. Such polymerizable monomers include the alkylenes such as ethylene, propylene, butene, and pentene; the ethylenically unsaturated aromatics such as styrene, and p-chlorostyrene; the halogen substituted ethylenically unsaturated monomers such as vinyl chloride, vinyl bromide; and the carboxylates such as methyl methacrylate, ethyl methacrylate, ethyl acrylate, methyl acrylate, and the like. Two or more of these monomers may also be copolymerized with the co-initiator systems used herein.

The following experimental work illustrates the use of the co-initiator systems of this invention for the polymerization of vinyl chloride which is typical of the reactions involved in this invention.

In all examples the reactions are carried out in 6½ ounce coke bottles. The co-initiator reactants, because of the very small amounts needed per bottle, are first made into dilute solutions in a volumetric flask.

The preformed initiators are dissolved in toluene, the basic catalysts are dissolved in distilled water, the acyl peroxy alkyl chloroformates are dissolved in n-hexane, and the peracids are dissolved in ethylformate. The solutions are made up so that when one milliliter is pipetted into each bottle, it contains the correct amount of reactant. This eliminates the need to weigh each individual portion of reactant or to use vials as has been done heretofore.

EXAMPLE I

A standard dispersing solution was prepared by adding to 12 moles of water, 15.00 grams of $Na_3PO_4 \cdot 12 H_2O$ (a buffering agent), and 16.92 grams of the thickening agent-Methocel 65 HG 50cps (a carboxylated cellulose). This solution was then diluted to 14.1 liters with distilled water. The master suspension solution thus prepared was used in this and all of the following examples.

94 grams of this suspension solution was added to a 6½ ounce coke bottle and frozen. To the frozen dispersing solution was added 50 grams of vinyl chloride monomer followed by molar amounts of initiator forming reactants equal to 0.075 wt. percent acyl peroxy alkyl carbonate.

The bottle was tightly capped and placed in a rotating water bath maintained at approximately 50° C. for about 12 hours. Thereafter, the bottle was cooled to 20° C. and unreacted monomer vented to the atmosphere. The polyvinyl chloride was filtered, washed and dried. Each polymerization was carried out twice. Yields of polyvinyl chloride in Table I are expressed as a percent of the total monomer charge. Weight percents reported are based on the total weight of the reaction system.

TABLE 1

IN SITU PEROXIDE FORMATION FOR POLYMERIZATION OF VINYL CHLORIDE
12 Hours at 50 ± 0.5 C.
0.000213 moles charged = 0.075% wt. acetyl peroxy isobutyl carbonate

| Peroxide Formed In situ: | Base | Yield PVC,g | Ave. % Conversion |
|---|---|---|---|
| 1. Acetyl peroxy isobutyl carbonate | (a) $NaHCO_3$ | 37.9, 35.5 | 73.4 |
|  | (b) $Na_3PO_4$ | 34.6, 35.5 | 70.1 |
|  | (c) $Na_2CO_3$ | 34.5, 33.0 | 67.5 |
|  | (d) NaOH | 32.6, 31.7 | 64.3 |
|  | (e) Pyridine | 27.4, 26.4 | 53.8 |
| 2. Propionyl peroxy isobutyl carbonate | (a) Pyridine | 36.6, 37.5 | 74.1 |
|  | (b) $NaHCO_3$ | 31.8, 31.9 | 63.7 |
|  | (c) NaOH | 29.9, 31.9 | 61.8 |
|  | (d) $Na_2CO_3$ | 31.6, 30.2 | 61.8 |
|  | (e) $Na_3PO_4$ | 30.0, 30.8 | 60.8 |

Conversion varies with both basic catalysts and peracid used. The combination of peracetic acid with $NaHCO_3$ and perpropionic acid with pyridine gave the highest and almost equivalent yields of polyvinyl chloride.

EXAMPLE II

Vinyl chloride was twice polymerized using a co-initiator system comprising 0.20 wt. percent lauroyl peroxide and 0.045 wt. percent preformed and 0.052 wt. percent in situ formed acetyl peroxy isobutyl carbonate, respectively.

The reaction was carried out in a manner similar to Example I. The desired base and the lauroyl peroxide were added to a coke bottle containing 94.0 grams of frozen standard suspension solution. The bottles were capped and placed into a freezer. To reduce or eliminate decomposition of the peracids or hydrolysis of the isobutyl chloroformate, the in situ reactants were added by pipetting into the frozen bottles just before addition of 50 grams of the vinyl chloride monomer. The bottles were then tightly capped and placed in a rotating water bath maintained at 50° C. for approximately 12 hours. Thereafter, the bottles are cooled at 20° C. and the unreacted monomer vented to the atmosphere. The polyvinyl chloride was filtered, washed and dried. Yields, expressed as a weight percent of the total monomer charge are reported below.

formed acetyl peroxy isobutyl carbonate and pyridine base. The yields obtained with propionoyl peroxy isobutyl carbonate are almost equally as good.

TABLE 2

USE OF CO-INITIATOR SYSTEM TO POLYMERIZE VINYL CHLORIDE AT 50 ± 0.5° C. FOR 12 HOURS

| Co-initiator System | Base | Yield PVC, g | Ave. % Conversion |
|---|---|---|---|
| 1. 0.20% wt. Lauroyl peroxide 0.045% wt. Acetyl peroxy isobutyl carbonate preformed | — | 35.7, 35.4 | 71.1 |
| 2. 0.20% wt. Lauroyl peroxide 0.052% wt. Acetyl peroxy isobutyl carbonate, formed in situ | (a) Pyridine | 43.7, 43.1 | 86.8 |
| | (b) NaHCO$_3$ | 34.8, 33.3 | 68.1 |
| | (c) Na$_2$CO$_3$ | 31.4, 32.7 | 64.1 |
| | (d) Na$_3$PO$_4$ | 30.6, 30.4 | 61.0 |
| | (e) NaOH | 29.9, 30.8 | 60.7 |

In all cases, suitable yields of polymer were obtained. Surprisingly good polymer yields were obtained with the in situ system reacted in the presence of pyridine.

EXAMPLE IV

Following the procedures of Example II, vinyl chloride is polymerized with various co-initiator systems

TABLE 4

USE OF CO-INITIATOR SYSTEM TO POLYMERIZE VINYL CHLORIDE AT 50 ± 0.5° C.

| Co-Initiator System | Base | Time, hr. 2 | % Conversion 4 | 6 | 8 | 10 | 12 |
|---|---|---|---|---|---|---|---|
| 1. 0.20% wt. Lauroyl peroxide 0.0425% wt. Acetyl peroxy isobutyl carbonate, preformed | — | 9.9 | 20.3 | 34.1 | 44.9 | 58.3 | 69.1 |
| 2. 0.20% wt. Lauroyl peroxide 0.0425% wt. Acetyl peroxy isobutyl carbonate, formed in situ | Pyridine | 7.9 | 19.8 | 36.2 | 50.6 | 68.5 | 87.8 |
| 3. 0.20% wt. Lauroyl peroxide 0.0425% wt. Acetyl peroxy isobutyl carbonate, formed in situ | NaHCO$_3$ | 6.2 | 14.2 | 24.0 | 37.9 | 49.0 | 62.8 |

EXAMPLE III

Following the procedure as outlined in Examples I and II, vinyl chloride was polymerized using various co-initiator systems, wherein the in situ formed initiator was reacted in the presence of pyridine. The results of comparing polymer yields with a preformed system containing lauroyl peroxide alone are reported in Table 3.

From the above it is seen that pyridine causes little if any induced decomposition of the lauroyl peroxide. Additionally, highest polyvinyl chloride yields are obtained with a co-initiator system including in situ both with and without a base. Yields versus time data are reported below for these co-initiator systems.

While good yields were obtained for all three systems, superior yields are obtained with an in situ formed acetyl peroxy isobutyl carbonate and pyridine base.

TABLE 3

USE OF CO-INITIATOR SYSTEM TO POLYMERIZE VINYL CHLORIDE AT 50 ± 0.5° C. FOR 12 HOURS

| Co-initiator System | Base | Yield PVC,g | Ave. % Conversion |
|---|---|---|---|
| 1. 0.20% wt. Lauroyl peroxide | — | 20.5, 20.1 | 40.6 |
| 2. 0.20% wt. Lauroyl peroxide | Pyridine | 19.9, 19.4 | 39.3 |
| 3. 0.20% wt. Lauroyl peroxide 0.045% wt. Acetyl peroxy isobutyl carbonate, preformed | — | 37.1, 38.8 | 75.9 |
| 4. 0.20% wt. Lauroyl peroxide 0.045% wt. Acetyl peroxy isobutyl carbonate, formed in situ | Pyridine | 43.4, 44.2 | 87.6 |
| 5. 0.20% wt. Lauroyl peroxide 0.049% wt. Propionoyl peroxy isobutyl carbonate, formed in situ | Pyridine | 43.5, 43.1 | 86.6 |

EXAMPLE V

Following the procedure set forth in Example II, various chloroformates are reacted with peracidic acid in the presence of a sodium bicarbonate base. The results are reported in Table 5.

TABLE 5

USE OF CO-INITIATOR SYSTEM TO POLYMERIZE VINYL CHLORIDE AT 50 ± 0.5° C.
for 12 HOURS
(a) 0.20% Lauroyl peroxide
(b) 0.000121 Moles acetyl peroxy alkyl carbonate formed in situ in $NaHCO_3$

| Chloroformate Used | Yield PVC,g | Ave. % Conversion |
|---|---|---|
| 1. Ethyl | 44.5, 45.3 | 89.8 |
| 2. 3-Chloropropyl | 38.8, 38.6 | 77.4 |
| 3. Isopropyl | 34.7, 34.4 | 69.1 |
| 4. Isobutyl | 32.0, 30.8 | 62.8 |
| 5. n-Butyl | 30.2, 30.1 | 60.3 |
| 6. p-t-Butyl Cyclohexyl | 19.1, 19.1 | 38.2 |

In all cases significant yields of polyvinyl chloride were obtained. Best yields were obtained with those chloroformates having the greatest water solubility.

EXAMPLE VI

The procedure of Example V is repeated, pyridine replacing sodium bicarbonate as the base.

TABLE 6

USE OF CO-INITIATOR SYSTEM TO POLYMERIZE VINYL CHLORIDE AT 50 ± 0.5° C. FOR 12 HOURS
(a) 0.20% wt. Lauroyl peroxide
(b) 0.000121 Moles Acetyl Peroxy Alkyl Carbonate formed in situ in Pyridine

| Chloroformate Used | Yield PVC,g | Ave % Conversion |
|---|---|---|
| 1. Isobutyl | 44.1, 43.7 | 87.8 |
| 2. Isopropyl | 43.7, 43.4 | 87.1 |
| 3. n-Butyl | 42.9, 43.6 | 86.5 |
| 4. Ethyl | 41.8, 42.0 | 83.8 |
| 5. p-t-Butyl Cyclohexyl | 40.6, 40.5 | 81.1 |
| 6. 3-Chloropropyl | 34.4, 33.3 | 67.7 | base, suprisingly superior yields are obtained with an in situ formed co-initiator system.

EXAMPLE VIII

Following the procedures of Example III, vinyl chloride was polymerized in the presence of a lauroyl peroxide — acetyl peroxy isobutyl carbonate formed in situ co-initiator system in the presence of various tertiary amine bases; the results are reported below.

TABLE 8

USE OF CO-INITIATOR SYSTEM TO POLYMERIZE VINYL CHLORIDE AT 50 ± 0.5° C. for 12 HOURS
(a) 0.20% Lauroyl peroxide
(b) 0.000121 Moles Acetyl Peroxy Isobutyl Carbonate Charged with Various Tertiary Amines

| Tertiary Amine Used | Yield PVC,g | Ave. % Conversion |
|---|---|---|
| 1. Pyridine | 44.1, 43.7 | 87.8 |
| 2. 3-Picoline | 39.6, 39.1 | 78.7 |
| 3. 2,6-Lutidine | 33.1, 33.3 | 66.4 |
| 4. 2-Picoline | 29.1, 31.1 | 60.2 |
| 5. Triethylamine | 20.9, 21.2 | 42.1 |
| 6. Quinoline | 12.7, 13.3 | 26.0 |
| 7. N,N-Dimethyl Analine | 12.5, 12.4 | 24.9 |
| 8. N,N-Diethyl Analine | 11.3, 11.5 | 22.8 |

While polymerization proceeds in every case, best yields are obtained with pyridine. Although this might seem to be surprising as triethylamine is a stronger base than pyridine, it is believed that the stronger base causes the chloroformate to hydrolyze. The yield of peroxy carbonate is thus reduced.

EXAMPLE VII

Repeating the procedures of Example II, polymerization rate data was obtained for a series of polymerization using both a preformed co-initiator system and a combination of preformed and in situ co-initiator system with two difference bases, and the results reported below.

TABLE 7

USE OF CO-INITIATOR SYSTEM TO POLYMERIZE VINYL CHLORIDE AT 50 ± 0.5° C.

| Co-Initiator System | Base | Time, Hrs. 2 | 4 | 6 | 8 | 10 | 12 |
|---|---|---|---|---|---|---|---|
| 1. 0.20% Lauroyl peroxide 0.0425% APBC[1], preformed | — | 9.9 | 20.3 | 34.1 | 44.9 | 58.3 | 69.1 |
| 2. 0.20% Lauroyl peroxide 0.0358% APEC[2] formed in situ | $NaHCO_3$ | 9.1 | 23.8 | 39.9 | 54.9 | 69.7 | 85.4 |
| 3. 0.20% Lauroyl peroxide 0.0425% APBC, formed in situ | $NaHCO_3$ | 6.2 | 14.2 | 24.0 | 37.9 | 49.0 | 62.8 |
| 4. 0.20% Lauroyl Peroxide 0.0358% APEC, formed in situ | Pyridine | 8.4 | 20.5 | 37.1 | 48.4 | 62.9 | 75.5 |
| 5. 0.20% Lauroyl peroxide 0.0425% APBC, formed in situ | Pyridine | 7.9 | 19.8 | 36.2 | 50.6 | 68.5 | 87.8 |

[1] Acetyl Peroxy Isobutyl Carbonate
[2] Acetyl Peroxy Ethyl Carbonate

Significant polymer yields were obtained in all runs. It is further shown that in the presence of a suitable

EXAMPLE IX

Repeating the procedure of Example II, vinyl chloride is polymerized using various preformed diacyl peroxide and nitrile initiators in combination with in situ formed acyl monoperoxycarbonates; the results are reported in Table 9.

TABLE 9

USE OF CO-INITIATOR SYSTEM TO POLYMERIZE VINYL CHLORIDE AT 50 ± 0.5 C.

| Co-initiator System | Base: Pyridine Time, Hours | % Conversion | | | | | |
|---|---|---|---|---|---|---|---|
| | | 2 | 4 | 6 | 8 | 10 | 12 |
| 1. 0.15% Pelargonoyl Peroxide 0.0425% APBC[1], preformed | | 9.6 | 22.3 | 35.8 | 48.8 | 62.9 | 77.0 |
| 2. 0.15% Pelargonoyl Peroxide 0.0425% APBC, formed in situ | | 7.1 | 18.6 | 33.3 | 49.1 | 65.8 | 82.0 |
| 3. 0.15% Isononoyl peroxide 0.0425% APBC, preformed | | 9.0 | 21.4 | 35.8 | 50.1 | 62.9 | 77.2 |
| 4. 0.15% Isononoyl peroxide 0.0425% APBC, formed in situ | | 7.6 | 20.3 | 36.5 | 50.5 | 66.3 | 80.9 |
| 5. 0.08% Vazo [2] 0.0425% APBC, preformed | | 10.8 | 28.5 | 43.8 | 60.8 | 79.3 | 92.0 |
| 6. 0.08% Vazo 0.0425% APBC, formed in situ | | 7.4 | 20.7 | 36.8 | 55.0 | 75.5 | 93.5 |

[1] Acetyl peroxy isobutyl carbonate
[2] α, α'-azobis-isobutyronitrile

From the above it can be seen that in all cases, good yields of polymer were obtained, with the best yields being obtained with the in situ co-initiator system.

Having thus described our invention, other changes and modifications will be readily apparent to those of ordinary skill in the art, and within the scope of the present invention, defined by the following claims.

What we claim is:

1. An improved method for polymerization of addition polymerizable monomers having ethylenic unsaturation, comprising:
   combining in an suitable liquid, said monomer, a catalytic polymerization composition consisting of a first initiator, which is a symmetrical diacyl peroxide of the formula:

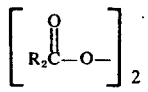

wherein:
$R_2$ is branched or straight chain alkyl, aryl, cycloalkyl, and substituted derivatives thereof;
a peracid of the formula:

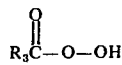

and a chloroformate of the formula:

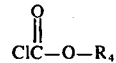

wherein:
$R_3$ and $R_4$ are selected from branched or straight chain alkyl, cycloalkyl, and substituted derivatives thereof, and wherein $R_3$ can additionally be aromatic, in the presence of sufficient base to neutralize the hydrochloric acid generated by the reaction of said peracid and said chloroformate to form as a second initiator:

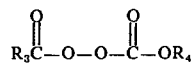

wherein:
$R_3$ and $R_4$ have been defined previously; and
maintaining the mixture at a temperature and for a sufficient time to substantially polymerize said monomer.

2. A method according to claim 1, wherein the monomer is dispersed in water as a suspension.

3. A method according to claim 1, wherein said ethylenic unsaturated monomer is vinylchloride.

4. A method according to claim 1, wherein said first initiator component is lauroyl peroxide, said peracid is selected from the group consisting of peracetic acid and perpropionic acid and said chloroformate is selected from the group consisting of ethyl chloroformate, propyl chloroformate and butyl chloroformate.

5. A method according to claim 1, wherein said base is pyridine.

* * * * *